United States Patent Office 2,849,381
Patented Aug. 26, 1958

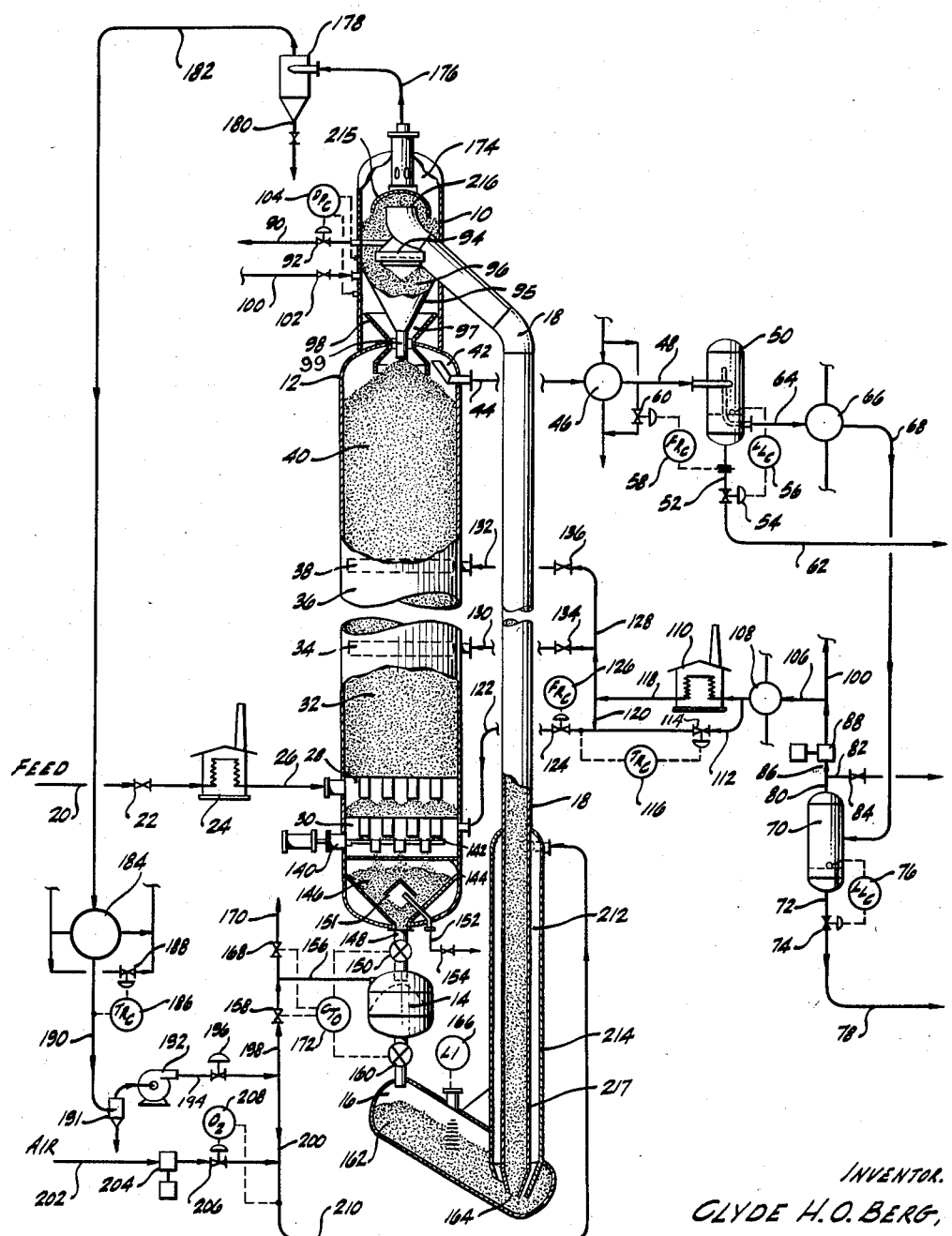

2,849,381

HYDROCARBON CONVERSION PROCESS AND APPARATUS

Clyde H. O. Berg, Long Beach, Calif., assignor to Union Oil Company of California, Los Angeles, Calif., a corporation of California Application June 25, 1954, Serial No. 439,226

19 Claims. (Cl. 196—52)

This invention relates to a continuous process and apparatus for the contacting of a fluid with a granular solid contact material and in particular relates to an improved process and apparatus for hydrocarbon conversions wherein a hydrocarbon stream is contacted with a stream of granular solid contact material, such as a granular solid hydrocarbon conversion catalyst, which material is recirculated successively through a contacting or reaction zone and through a solids regeneration or reheating zone. One specific feature of the present invention is an improved method and apparatus for regenerating and reheating solid catalyst or other solid contact material employed in such processes, and an improved system of gas and vapor seals which totally eliminates the usual requirement of such seals using a "foreign" gas or vapor such as steam and thus the adverse effects of steam on some hydrocarbon conversion catalysts and like contact materials has been avoided.

Hydrocarbon fractions in particular and many other fluid reactant streams in general are advantageously treated under reaction conditions of temperature and pressure in the presence of a solid granular contact material, which may or may not have catalytic activity, to produce fluid products having improved properties. In the field of petroleum refining, hydrocarbon fractions boiling between the limits of about 75° F. and 1000° F. and including the light and heavy naphthas or gasolines and the light and heavy gas-oil fractions, are treated at relatively high pressures and temperatures in the presence of solid contact materials to coke, crack, desulfurize, denitrogenate, hydrogenate, dehydrogenate, reform, aromatize, isomerize, or polymerize such hydrocarbon fractions to produce products having desirable properties which particularly well suit them for hydrocarbon cracking feed, gasoline blending stock, solvents, or diesel or jet engine fuels and the like.

In all of the foregoing processes which utilize a recirculating stream of solid contact material, the usual problems of transporting the solids with minimum energy and without substantial attrition loss in a superatmospheric temperature and pressure system are involved. In some cases separate contacting and regeneration vessels are employed which require them to employ separate conveyance steps to transport the solids from the bottom of each vessel to the top of the other. Sometimes these processes are effected in a single column so that only a single solids transport step is required, the regenerator and reactor being located one above the other in the column. The disadvantage of the former modification is the necessity for two columns and the requirement for two separate solids handling steps. The principal disadvantage of the second modification is primarily structural in that with superimposed reaction and regeneration zones an excessively high mechanical structure is required, sometimes exceeding 200 feet in elevation. A further disadvantage of the single column operation lies in the fact that the conveyance distance is not materially different from the total conveyance distance in the two-column modification.

Conventionally, the granular solids have been conveyed for recirculation by mechanical elevators, by suspension in a conveyance fluid in the well-known gas lift or pneumatic conveyance systems, and the like. Although the mechanical operators operate with quite low energy requirements, they are practically impossible to maintain at operating temperatures of around 1000° F. and at superatmospheric pressure conditions. Although the so-called gas lift type of conveyer readily operates at superatmospheric pressures, tremendous quantities of gas are required in contacting systems recirculating contact material at high solids to fluid ratios. In addition, the fact that the solid particles move at relatively high velocities of the order of 50–100 feet per second and are free to impact the inner conveyer walls and each other are the causes of an excessively high solids or catalyst attrition rate.

In such processes wherein the contact material is recirculated through a regeneration zone and then through a reaction zone, a system of gas or vapor seals is conventionally used to prevent flow of incompatible fluids from one zone to the other. As an example, in hydrocarbon conversion processes, such seals are required to prevent passage of the oxygen-containing catalyst regeneration gas into the reaction zones containing hydrocarbon vapors, or the converse flow. Customarily these seals have involved the injection of a stream of inert gas, such as steam, which divides and a portion flows into each zone to prevent the mixing of the two vapors. Such steam seals have the extreme disadvantage that very often the catalysts or solid contact material is adversely affected at high temperatures by contact with steam and catalyst activities are extensively decreased. Of course the steam introduces water into the hydrocarbon or other product and requires facilities for steam generation. These are serious problems which heretofore have not been solved successfully.

The present invention is directed to an improved process and apparatus of such a nature that all of the foregoing conveyance and regeneration problems and disadvantages are simultaneously eliminated in an integrated process for contacting reacting fluids with recirculating solid contact material.

It is a primary object of this invention to provide an improved process for fluid-solids contacting operations in which granular solids are recirculated and simultaneously treated to effect a substantially complete reheating or regeneration during a single conveyance step.

It is an additional object of this invention to provide a simultaneous conveyance-regeneration process for the conveyance and regeneration of spent granular contact material in a solids-fluid contacting process and which operates at high mechanical efficiency, causes substantially no granular solids attrition, and effects a substantially complete solids regeneration or reheating during the conveyance, a result which is impossible in the conventional gas-lift conveyances.

It is a specific object of this invention to provide in the integrated process referred to above an improved method of sealing the contacting and regeneration steps from each other and to pretreat the regenerated solids in such a way as to eliminate the conventional inert gas seals and the undesirable effects thereof.

It is a further object of this invention to provide an improved method for removing heat from a conveyance-regeneration zone involving a recycle stream of conveyance-regeneration gas, the recirculation rate of which is reduced to a minimum by a heat exchange step between the entering regeneration-conveyance gas and the granular contact material during the initial stages of its conveyance and regeneration.

It is an additional object of this invention to provide an improved apparatus for accomplishing the foregoing objects.

Other objects and advantages of the present invention will become apparent to those skilled in the art as the description thereof proceeds.

Briefly, the present invention comprises an improved process and apparatus for the continuous contacting of reactive fluids with granular solid contact material in a reaction or conversion zone. The granular material, which may have catalytic properties, is recirculated from the reaction zone upwardly as a substantially compact or dense-packed moving bed of granular solids through a conveyance-regeneration zone and is discharged therefrom in fully regenerated form directly into the top of the reaction zone for reuse.

It is immediately apparent that the double conveyance required in the conventional contacting processes employing separate regeneration and reaction vessels has been avoided and substituted with a single conveyance of less than half the distance heretofore required because the usually required sealing legs of great length used in gas-lift suspension conveyances are eliminated. It is also apparent that the distance for conveyance in this invention is reduced by more than one-half from the distance required in the conventional processes using superimposed reaction and regeneration zones and that accordingly the physical structure of the apparatus of this invention has been substantially reduced with attendant economic savings.

Spent granular solids removed from the bottom of the reaction zone are conveyed upwardly as a dense moving bed through the conveyance-regeneration zone or conduit by employing a series of novel and critical steps. The spent granular solids are introduced into the conveyance-regeneration zone in such a manner that its inlet opening is submerged and surrounded by a dense bed of solids to be conveyed. This is conveniently done by providing an induction zone or chamber into which the solids may be introduced at its upper end and surrounding the inlet opening of the conveyance-regeneration zone at a low point therein so that solids upon introduction cover and submerge the inlet opening. Immediately adjacent the outlet opening of the conveyance-regeneration zone, a means is provided for applying a thrust or compacting force against the moving bed of regenerated and conveyed granular material discharging therefrom. This may be done in several ways including the disposition of a mesh or plate or cap immediately adjacent the outlet opening against which the moving bed of solids flows and then reverses its direction, or by discharging the solids in any direction directly into a chamber against a wall of the chamber or against a bed of previously discharged solids so that the outlet opening is submerged by a bed of such solids as when solids are discharged upwardly or horizontally, or by discharging the solids downwardly into such a chamber to form a conical pile whose apex intersects the outlet opening. The object of this step is to in some way restrict at the outlet opening the discharge of solids therefrom without effecting any substantial restriction on the discharge of conveyance-regeneration fluid at the same point so that the granular material in the conveyance-regeneration line is prevented from becoming fluidized or suspended in the conveyance fluid while it is moved and thus the moving solids are maintained substantially at their static bulk density, that is, at the same bulk density as that of a downwardly moving gravity-packed bed, which in turn is substantially the same as the bulk density of the solids when at rest.

The granular solids in this dense-packed form are caused to move by passing a concurrent flow of conveyance-regeneration fluid upwardly through the conveyance-regeneration zone at a rate sufficient to overcome the opposing forces of gravity acting on the solids and also to overcome opposing forces of friction of conveyance zone walls and the like which act against the solids when they are conveyed. This fluid flows through the serially connected interstices of the dense-packed mass of granular solids which presents a high resistance elongated path for the fluid flow. By maintaining a substantial pressure differential between the inlet and the outlet of the conveyance-regeneration zone, a sufficient quantity of fluid is forced to flow therethrough generating a more or less constant pressure gradient at all points along the length of the conveyance-regeneration zone so as to apply a conveyance force uniformly throughout the zone. The ratio of the resulting conveyance force tending to move the solids to the forces of gravity acting in the opposite direction has been termed the conveyance force ratio and is given by:

$$\frac{\frac{dp}{dl}}{\rho_s \cos \theta} \quad (1)$$

wherein $$\frac{dp}{dl}$$

is the pressure gradient in pounds per square foot per foot, $\rho_s$ is the static bulk density of the granular solids being conveyed in pounds per cubic foot, and $\theta$ is the angular deviation of the direction of conveyance from an upward vertical reference axis. When the conveyance fluid flows at a rate sufficient to generate a pressure gradient which exceeds the forces of gravity expressed by the term $(\rho_s \cos \theta)$ in Equation 1, a slightly additional flow of fluid is sufficient to exceed opposing forces of friction and permit the solids to move continuously in dense or compact form as an upwardly moving bed when a bed of solids is continuously supplied at the inlet and dense granular solids are continuously withdrawn at a controlled rate from the discharged mass of solids at the outlet of the conveyance-regeneration zone.

Because of the substantial pressure gradient characteristic of this form of conveyance and because of the fact that there is only a relatively minor pressure differential existing between the inlet and outlet of a solids-fluid contacting vessel, it is apparent that the present conveyance-regeneration system cannot be directly connected at both its outlet and inlet respectively to the solids inlet and outlet of the contacting zone. In the present invention only one of the aforementioned connections is made and the other connection is made indirectly through a granular solids pressuring vessel into which granular solids are charged at a relatively low pressure, the vessel is sealed, high pressure fluid is injected to increase the pressure by an amount approximating the characteristic pressure differential of the conveyance-regeneration zone, and then the solids are discharged at the higher pressure. If the inlet to the conveyance-regeneration zone communicates directly with the outlet of the reaction zone, this pressuring step is employed to receive solids from the outlet of the conveyance-regeneration zone and to pressure them into the top of the reaction zone. When the outlet of the conveyance zone communicates directly with and at substantially the same pressure as the reaction zone, the pressuring zone receives solids at that pressure from the bottom of the reaction zone and pressures them into the inlet of the conveyance-regeneration zone as is illustrated in the accompanying drawing. So far as the present invention is concerned, the pressuring step can be in any part of the cycle, that is, either before or after conveyance-regeneration.

The present invention is particularly well adapted to the handling of granular solid materials in the well-known hydrocarbon conversion processes mentioned above and in which a liquid or vaporized hydrocarbon is contacted directly with a moving mass of contact material, usually having catalytic activity. During such process, the catalyst ordinarily becomes deactivated after a variable period of contact and is contaminated by a hydrocarbonaceous deposit generally referred to as coke. During the regeneration, the coked catalyst is treated with an oxygen-containing regeneration gas whereby the hydrocarbonaceous material is burned from the catalyst and the activity is restored. With most spent hydrocarbon conversion catalysts, the oxygen-containing regeneration gas will not initiate and sustain combustion until the spent catalyst is raised in temperature to about 700° F. Most hydrocarbon conversion catalysts also cannot be heated during regeneration to temperatures much above about 1100° F. and the spent conveyance-regeneration gas is disengaged from the regenerated catalyst at temperatures below this value. These then are the temperature limits within which the conveyance-regeneration zone must operate when handling spent hydrocarbon conversion catalysts.

In the process of his invention, the removal of heat from the conveyance-regeneration zone is effected by maintaining a recycle of conveyance-regeneration gas upwardly through the conveyance-regeneration zone and then through external heat interchange means and back into the inlet of the zone. The conveyance-regeneration gas is disengaged from the regenerated solids and discharged at the top of the unit at temperatures of the order of 1000° F. Ordinarily these gases can only be cooled to a temperature which will initiate combustion of the hydrocarbonaceous spent solids, that is, about 700° F. However, in the present invention a special heat interchange step is effected along at least the first part of the length of the conveyance-regeneration zone itself thereby maintaining low wall temperatures and permitting the regeneration gases to be cooled externally to temperatures considerably below this usual minimum temperature. This permits a substantial decrease in the required diameter of the conveyance-regenerator conduit which improves the heat transfer as well as a decrease in the quantity of conveyance-regeneration gas recycle needed to remove the heat generated in the regeneration system. This is due to the fact that in this specific type of upflow conveyance-regeneration the major portion of the coke burn-off occurs in the lower or first portion of the conveyance-regeneration zone and the minor portion of regeneration occurs in the upper regions of the zone. Accordingly the cooled regeneration gas is preheated indirectly from well below the spent catalyst ignition temperature by passing it in indirect heat exchange relation with the lower part of the conveyance-regeneration zone whereby it is heated to the temperature necessary to initiate combustion and is then introduced into the conveyance-regeneration zone for upward passage therethrough. Employing this technique has permitted reductions in conveyance-regeneration fluid recycle of up to 75% because the recycle gas can herein readily be cooled from 950° F. or higher to as low as 150° F. or lower (with condensate removal provision) instead of only to the 700° F. figure mentioned above.

In the process of this invention as applied to hydrocarbon conversion, the solid material moves downwardly as a moving bed in contact with a hydrocarbon and sometimes hydrogen, and then is recirculated from the bottom of the contacting zone upwardly through a conveyance-regeneration zone in contact with an oxygen-containing conveyance-regeneration zone back to the contacting zone. These two fluid systems are incompatible and appreciable flow of fluid between them establishes an explosion hazard.

The sealing of these two systems from one another is accomplished in the process of this invention at two points, namely, at the solids entrance to and exit from the contacting zone.

The regenerated solids are discharged from the conveyance-regeneration zone, in the presence of a regeneration fluid such as flue gas which may contain small amounts of oxygen, into an upper solids pretreating and separator zone. The solids pass downwardly as a moving bed past a pretreating and seal gas disengaging zone through a pretreating and sealing leg zone and into the contacting zone. A pretreating gas engaging zone surrounds the pretreating and sealing leg zone and communicates therewith at its solids discharge point.

The conveyance-regeneration gas at the outlet of the conveyance-regeneration zone is divided into a primary or major portion and a secondary or minor portion. The primary portion is disengaged from the conveyed solids and is removed from the pretreating and separator zone for cooling, oxygen injection, and recirculation through the conveyance-regeneration zone as described. The secondary portion passes concurrently with the solids and enters the pretreating and sealing gas disengaging zone.

A solids pretreating gas, containing hydrogen in the case of some reforming and desulfurization catalysts, is introduced into the pretreating gas injection zone and passes downwardly around the solids pretreating zone into the bed of solids discharged into the bottom of the pretreating gas engaging zone from the lower end of the solids pretreating zone at a point adjacent the top of the contacting zone. At this point the pretreating gas stream divides into a primary pretreating gas portion which passes concurrently with solids from the pretreating zone through the bed of solids in the lower part of the pretreating gas engaging zone into the top of the contacting zone and there joins the reactant fluids flowing therethrough. This primary pretreating gas stream thus prevents passage of the reactant fluid into the pretreating gas engaging zone and the solids pretreating zone. The secondary portion of solids pretreating gas enters the pretreating and sealing leg zone, passes upwardly therethrough to pretreat the solids and prevent downward flow of the secondary regeneration fluid stream described above. The secondary pretreating gas enters the pretreating and sealing gas disengaging zone at one point and mixes therein with the secondary regeneration fluid portion which enters at another point. Any interaction between these secondary fluid portions occurs therein out of contact with the solids because they are respectively disengaged from the solids and enter the disengaging zone at different points. The residual oxygen content of the secondary flue gas stream is rarely over 0.5% and combustion proceeds smoothly with no appreciable temperature rise.

The mixture of secondary fluid portions is removed from the pretreating and sealing gas disengaging zone at at a rate controlled to maintain a fixed pressure differential between the lower and upper end of the pretreating zone due to the upward countercurrent flow of the secondary pretreating gas stream. In this manner the conveyance-regeneration fluids from the conveyance-regeneration zone are prevented from flowing into admixture with the reactant fluids in the contacting zone, and vice versa, without the use of a foreign sealing gas such as steam.

At the point of solids removal from the contacting zone, a second seal gas disengaging zone is provided below the reactant fluid inlet and above the solids outlet. As will be described in greater detail below, a second seal gas stream is removed therefrom which consists of a mixture of flue gas entering the contacting column from the solids pressuring zone through the solids outlet and a small portion of the reaction gas entering from the contacting zone above. In the process of this invention as applied to naphtha reforming and desulfurization, the naphtha reactant contacts the catalyst in the presence of hydrogen. Preferably the hydrogen is introduced into the contacting zone at a point closer to the nearest end of the zone than the naphtha inlet so that it acts as a solids stripping gas. In this case a small part of the hydrogen only flows concurrently with the solids and enters the second seal gas disengaging zone preventing any flow of naphtha thereinto.

The foregoing description is based upon a countercurrent contact between the solids and the reactant fluid, but a concurrent contact could be substituted using these same sealing and solids pretreating procedures.

The seal gas streams thus produced are usually combustible in spite of their flue gas content because of the presence therein at the secondary portion of the solids pretreating gas described above. Preferably these seal gas streams are burned as fuel.

The present invention will be more readily understood by reference to the accompanying drawing which is a combination flow diagram of the process of this invention and a detailed drawing of an elevation view in partial cross section of the contacting and regeneration apparatus. The description of the drawing is conducted in terms of a specific example of the present invention as applied to the continuous reforming and desulfurization of a petroleum naphtha in the presence of hydrogen by means of a recirculating stream of cobalt molybdate catalyst to produce a desulfurized and aromatic gasoline blending stock.

The permissible operating conditions for naphtha reforming and desulfurization are from 700–1100° F., from 50 to 2000 p. s. i. g., and from 500 to 10,000 s. c. f. of hydrogen per barrel of naphtha feed. The following example gives the specific operating conditions of one installation.

Referring now more particularly to the drawing, the apparatus consists essentially of catalyst separator and pretreating chamber 10 into which the regenerated catalyst is discharged, naphtha reforming column 12 through which the catalyst passes downwardly as a moving bed by gravity, catalyst pressuring chamber 14 receiving spent catalyst from reforming chamber 12, induction chamber 16 into which the spent pressured catalyst is discharged, and conveyance-regeneration chamber 18 through which the spent catalyst is conveyed and regenerated and discharged for recirculation into separator chamber 10.

The apparatus of this invention as shown in the drawing is for the catalytic reforming and desulfurization of 1100 barrels per stream day of a petroleum naphtha having the following properties:

TABLE I

*Naphtha feed*

| | |
|---|---|
| Boiling range, ° F | 240–420 |
| A. P. I. gravity | 46.3° |
| Sulfur weight percent | 0.578 |
| Nitrogen weight percent | 0.020 |
| Knock rating (F–1 clear) | 61.8 |
| Naphthene volume percent | 42 |
| Aromatics volume percent | 15 |

This naphtha feed is introduced through line 20 at a rate of 1100 barrels per day controlled by valve 22 and is preheated by exchange with hot regeneration gas recycle in interchanger 184 described subsequently, and then is further heated and vaporized in fired heater 24. The naphtha vapor is introduced through transfer line 26 at a temperature of 900° F. and a pressure of 405 p. s. i. g. into naphtha engaging zone 28 in column 12. A primary stream of recycle gas containing hydrogen is introduced through primary recycle gas engaging zone 30 at a rate of 1700 MSCF per day and at a temperature of 900° F. The mixture of naphtha vapor and hydrogen passes upwardly through primary reforming zone 32 countercurrent to the downflowing bed of cobalt molybdate catalyst. Herein the cyclization of paraffin hydrocarbons takes place to form naphthenes and the endothermic aromatization of the naphthene hydrocarbons takes place and results in a temperature decrease. To maintain an approximately constant temperature profile throughout reaction column 12, a secondary hydrogen recycle stream is introduced into secondary recycle gas engaging zone 34 at a temperature of 1150° F. and at a rate of 1130 MSCF per day to increase the temperature of the reacting mixture to about 910° F. The thus reheated mixture passes countercurrent to the catalyst through secondary reforming zone 36 wherein a further temperature decrease takes place due to the continuing endothermic aromatization reactions. A tertiary stream of recycle gas at 1150° F. is introduced into tertiary recycle gas engaging zone 38 at a rate of 1290 MSCF per day to raise the reactant mixture temperature again to about 910° F. The mixture then continues upwardly through tertiary reforming zone 40 from which the effluent is removed from disengaging zone 42 at a temperature of about 880° F. and at 400 p. s. i. g. through line 44.

The effluent vapor is passed through interchanger 46 wherein heat is recovered in depropanizing the product and for preheating the naphtha feed and is thereby cooled to a temperature of 450° F. which is just sufficiently below the dew point of the effluent to effect a partial condensation of polymeric high boiling hydrocarbon materials having substantial gum forming tendencies when employed as internal combustion engine fuels. The cooled and partially condensed effluent then passes through line 48 and is introduced into separator 50 which is preferably a cyclone known as the Webre cyclone. Herein the partial condensate, amounting to a very small part of the total effluent, is separated from the vapor and is removed through line 52 at a rate controlled by valve 54 in accordance with liquid level controller 56. Flow recorder controller 58, which is adjusted to maintain a predetermined rate of flow of condensate through line 52, operates coolant bypass valve 60 so that the hot effluent flowing through line 44 is cooled sufficiently to partially condense that desired proportion of the reactor effluent.

The preferred proportion so condensed is a very minor amount ranging from 0.01% up to about 10% by volume. Preferably this proportion is between about 0.1% and about 5%, and in the experimental verification of the present invention it has been found that partial condensation of about 2.2% by volume was sufficient to substantially eliminate the so-called heavy ends or polymer from the effluent so as to avoid the usual necessity for rerunning the depropanized liquid product, which invariably results in some thermal degradation forming additional high boiling polymeric materials.

In the present invention, slightly more than 2% by volume of the effluent is condensed and is removed at a rate of 22 barrels per day by means of line 62. This material contains reformed gasoline boiling below about 420° F. and accordingly is returned for redistillation with the material from which the naphtha feed to the process of this invention is prepared. This step, not shown for sake of simplicity in the drawing, is entirely conventional and effects a recovery of approximately 14.5 barrels of reformed gasoline boiling range product boiling below about 420° F.

The uncondensed portion of the effluent flows from cyclone 50 at a temperature of about 450° F. through line 64 and is further cooled and condensed in interchanger 66 in which heat is recovered by heat exchange with the hydrogen recycle gas as subsequently described. The condensed effluent together with the uncondensed hydrogen recycle gas flows through line 68 into product separator 70 in which the uncondensed gases are separated from the process product. The reformed naphtha product is removed through line 72 at a rate of 1118 barrels per day controlled by valve 74 in response to liquid level controller 76. This liquid is sent by means of line 78 to a conventional depropanizer, not shown, wherein propane and lighter hydrocarbon gases are separated to produce the reformed naphtha product of this invention. This product is produced at a rate of 1028 barrels per day and has the following properties:

TABLE II

*Reformed naphtha product*

| | |
|---|---|
| Boiling range, °F | 94–435 |
| A. P. I. gravity | 51.7 |
| Sulfur weight percent | 0.004 |
| Nitrogen weight percent | |
| Knock rating (F–1+3 cc. TEL) | 95 |
| Naphthenes volume percent | 14 |
| Aromatics volume percent | 40 |

The uncondensed portion of the effluent consists essentially of the hydrogen-containing recycle gas which is removed from separator 70 by means of line 80 and because of the net production of hydrogen in the process, the excess portion of this is bled from the system through line 82 at a rate of 140 MSCF per day controlled by valve 84. Part or all of this gas may be employed as fuel in the fired heaters in the process if desired.

The remaining recycle gas is passed through line 86 and is compressed from 375 p. s. i. g. to 425 p. s. i. g. in recycle gas compressor 88. Part of this compressed recycle gas is passed as a regenerated catalyst pretreating gas through line 100 at a rate of 165 MSCF per day controlled by valve 102 into separator and catalyst pretreating chamber 10. This pretreating gas is introduced below and around cone-shaped baffle 95 and passes therefrom downwardly through the annular space 97 constituting a pretreating gas engaging zone within the lower periphery of baffle 98 and then directly into the bed of regenerated catalyst within baffle 98 at the top of chamber 10. A secondary portion of this gas passes upwardly through sealing leg 99 and pretreating zone 96 countercurrent to the regenerated catalyst. By means of this countercurrent passage of gas the catalyst is pretreated with hydrogen to reduce the higher oxides of cobalt and molybdenum formed during regeneration to the lower oxides. The pretreating gas, along with the secondary portion of regeneration gas subsequently described coming down from the top of the lift line with the regenerated catalyst, is removed from beneath baffle or pretreating and sealing gas disengaging zone 94 through line 90 controlled by valve 92. The primary portion of the pretreating gas introduced through line 100 and passed downwardly through pretreating gas engaging zone 97 passes through the solids within baffle 98 and radially outwardly below the lower periphery of baffle 98 and is disengaged from the catalyst bed with the total reactor effluent in disengaging zone 42 at points around the lower periphery of baffle 98 and through line 44, and acts as a seal gas preventing the upflow of reactor effluent into the pretreating chamber 10. The secondary streams of pretreating gas and regeneration gas are removed from separator chamber 10 from disengaging zone 94 through line 90 at a rate of 205 MSCF per day controlled by valve 92 which in turn is actuated by differential pressure controller 104 to maintain a positive pressure differential between the top and the bottom of catalyst pretreating zone 96, that is, the pressure above cone-shaped baffle 95 is slightly less than the pressure below it and within baffle 98.

The remaining portion of the compressed recycle gas flows at a rate of 4120 MSCF per day through line 106 and is preheated in interchanger 108 to 350° F. in exchange with the reactor effluent after polymer removal (interchanger 66).

Of this preheated recycle gas, 3460 MSCF per day are further heated in fired preheater 110 to a temperature of 1150° F., and 660 MSCF per day passed through bypass line 112 at a rate controlled by valve 114 in response to temperature recorder controller 116. The primary hydrogen recycle gas, introduced into engaging zone 30 at a rate of 1700 MSCF per day and at 900° F., is produced by mixing 1040 MSCF per day of 1150° F. hydrogen flowing through lines 118 and 120 with the 660 MSCF per day of cooler hydrogen from line 112 and this material is then introduced through line 122 into the primary recycle gas engaging zone 30 at a rate controlled by valve 124 in response to flow recorder controller 126.

The remaining recycle gas at 1150° F. passes through manifold 128 and constitutes the secondary and tertiary recycle gas streams mentioned previously. These streams are introduced into engaging zones 34 and 38 through lines 130 and 132 at rates of 1130 MSCF per day and 1290 MSCF per day controlled by valves 134 and 136 respectively.

The spent hydrocarbonaceous catalyst passes downwardly through the column 12 at a rate controlled by solids feeders and stripper 140 which is provided with a reciprocating tray 142 and a lower stationary tray 144 so that upon reciprocation of tray 142 a substantially constant volumetric withdrawal of spent catalyst uniformly throughout the cross-sectional area of column 12 is achieved. Spent catalyst from feeder 140 accumulates as bed 146 which constitutes a surge volume, the level of which rises and falls as granular solids are withdrawn from the bottom of the column periodically through outlet 148 controlled by motor valve 150.

The spent solids are thus discharged into pressuring chamber 14 when it is depressured to about 400 p. s. i. g. causing a displacement gas to flow upwardly through outlet 148 into the bottom of reactor 12. A second seal gas comprising a mixture of this last-named gas and a small portion of the primary recycle gas stream, which passes downwardly through solids feeder 140, is removed from disengaging zone 151 through line 152 at a rate of 140 MSCF per day controlled by valve 154. This gas is mixed with the spent catalyst pretreating gas removed from the upper part of the column through line 90 and is employed as fuel.

The spent granular solids in pressuring chamber 14 are raised in pressure to 430 p. s. i. g. by the introduction of regeneration recycle gas through manifold 156 upon the opening of valve 158 described below. Following this pressuring step, valve 160 is opened and the pressured solids are discharged by gravity into induction chamber 16 to maintain the downwardly flowing bed 162 of spent granular catalyst to be conveyed and regenerated so as to submerge the lower inlet opening 164 of the conveyance-regeneration chamber. Level indicator 166 is provided to indicate the solids level of bed 162.

Valve 160 is then closed, motor valve 168 is opened, and pressuring vessel 14 is depressured from 430 pounds to about 400 pounds by the discharge of gas through lines 156 and 170. Valve 168 is then closed and valve 150 is reopened to remove additional spent catalyst and the solids pressuring cycle is repeated. The operation of valves 150, 158, 160, and 168 is controlled in sequence by cycle timer operator 172 so as to receive solids, pressure, discharge solids, and depressure at a rate sufficient to charge solids into induction chamber 16 at a rate equal to the solids circulation rate set by solids feeder 140.

Referring now to solids pretreater and separator 10, spent conveyance-regeneration gases are disengaged from the conveyed solids and a primary or major portion collecting in space 174 is removed therefrom through line 176 at a rate of 1612 MSCF per day and a temperature of 984° F. A secondary or minor stream passes downwardly with the solids and enters pretreating and seal gas disengaging zone 94 as described. This primary gas portion is passed into solids separator 178 wherein any catalyst fines elutriated from the catalyst stream in separator 10 are removed from the regeneration gas recycle. These solids are removed from separator 178 by means of line 180. The solids-free recycle gas then flows through line 182 through heat exchanger 184 in exchange with raw naphtha feed referred to above and is therein cooled to a temperature of about 640° F. This temperature is controlled by temperature recorder controller 186 which operates bypass valve 188 so as to control the naphtha coolant passing through interchanger 184. The cooled recycle gas passes through line 190 and is compressed to 430 p. s. i. g. in compressor 192. This recycle gas then flows through line 194 at a rate controlled by valve 196 and is divided into a solids pressuring stream flowing through line 198 to pressure solids in chamber 14, and a regeneration-conveyance stream flowing from line 200.

An oxygen-containing gas, such as air, is introduced via line 202. It is compressed to 433 p. s. i. g. in compressor 204 and is introduced at a rate of 123 MSCF per day controlled by valve 206 in response to oxygen recorded controller 208 for combination with the compressed conveyance-regeneration recycle gas flowing through line 200. The combined oxygen-containing conveyance-regeneration gas, which may contain from about 0.1 to about 10% oxygen and preferably from 0.5 to 5.0% oxygen, then passes at a temperature of about 646° F. and at a rate of 1735 MSCF per day through line 210 tangentially into the upper portion of regenerator heat exchange zone 212. This zone is contained within the annulus between the lower portion of conveyance-regeneration conduit 18 and jacket 214 which surrounds concentrically the lower portion of the conveyance-regeneration conduit. The regeneration gas passes downwardly through zone 212 and is preheated therein by means of the exothermic heat of regeneration liberated within the lower part of conveyance-regeneration zone 18 to a temperature of about 706° F. This preheated gas is injected directly into induction chamber 16 at a point below the level of the spent catalyst to be conveyed, it passes into inlet 164 of the conveyance-regeneration zone, and then upwardly therethrough at a rate sufficient to effect conveyance and regeneration of the spent catalyst. The regenerated catalyst is discharged against baffle 215 which applies a force against the mass of catalyst issuing from conveyance-regeneration conduit 18 and maintains the upwardly moving catalyst at a bulk density substantially equal to the static bulk density thereof. As stated above, the major part of the coke burn-off from the catalyst occurs in the lower or first part of the conveyance-regeneration zone and a substantial part of this endothermic heat is transferred through the conveyance conduit wall to preheat the conveyance-regeneration gas recycle and to keep the inner conveyance-regeneration conduit wall 217 cool. All of the net endothermic heat of regeneration however is removed as sensible heat in the conveyance-regeneration recycle, with the exception of usual heat losses.

The spent granular catalyst is substantially completely regenerated while passing upwardly through the conveyance-regeneration conduit and is discharged from outlet opening 216 of the conveyance conduit into separator chamber 10 previously described.

Because of the fact that the granular catalyst is maintained as a dense upwardly moving compact bed substantially at the static bulk density of the catalyst, the upward velocity and accordingly the residence time of the spent catalyst in the regeneration system is not limited by the height of the conveyer-regenerator or by the velocity of the conveyance-regeneration fluid circulated therethrough, as is the case in the conventional gas-lift or suspended solids system. Once the conveyance fluid rate is sufficient to exceed the force of gravity and friction on the moving bed, the catalyst will move as continuously fed at the inlet and removed from the outlet. Any necessary increases in conveyance-regeneration fluid rate necessary to remove heat from the system have absolutely no effect whatsoever upon the residence time of the catalyst in the system or the degree to which it is regenerated and the only external effect is one of somewhat increased pressure differential.

Accordingly, in the present process the spent catalyst may be completely regenerated by the removal of the entire quantity of hydrocarbonaceous deactivating materials during conveyance. In the present example, this is accomplished by utilizing an oxygen concentration of about 1.5% at the inlet of the conveyance-regeneration zone. The spent catalyst contains about 4.1% carbon and is discharged into separator 10 after regeneration containing less than about 0.1% carbon and the restoration of activity is essentially 100%.

Because of the novel heat transfer system maintained at the base of the conveyance-regeneration system, very substantial reductions of as much as 75% in the conveyance fluid recycle rate is attained relative to that resulting if the cooling of the gas were limited to a minimum temperature of 750° F., the regenerator inlet temperature needed to maintain spent catalyst combustion because the conveyance fluid recycle stream may be cooled in exchanger 184 to temperatures as low as 150° F. or lower (with provision for condensate removal in separator 191 if necessary) with this particular regenerator.

Due to the utilization of the novel system of gas seals at the solids inlet and outlet of the contacting column, the requirement for steam seals and the attendant problems of steam generation and catalyst deactivation have been entirely eliminated in the process of this invention.

In the apparatus of this invention, the entire structure above grade level is about 55 feet in height, the reactor column diameter is 4 feet 6 inches, and the conveyance-regeneration conduit is 14-inch schedule 40 pipe. The catalyst is circulated at a rate of 10.3 tons per day and moves at an upward velocity of 15.5 feet per hour through the regeneration-conveyance conduit. This low velocity is totally impossible to maintain in a gas-lift or pneumatic suspension conveyer, and herein it permits the complete regeneration of the catalyst during the lifting step.

Although the present invention has been described in considerable detail above with respect to gasoline or naphtha reforming, it should be understood that the principles of this invention and the advantages accruing therefrom are equally obtainable in any other hydrocarbon conversion process in which a recirculating granular contact material which requires regeneration is employed. It is therefore not intended to limit this invention to gasoline reforming specifically but on the contrary the invention relates to fluid-solids contact processes in general in which an exothermic regeneration of the contact of the recirculating contact occurs. This is true in most, if not all, of the hydrocarbon conversion processes employing contact solids including solid catalysts.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. In a solids-fluid contacting process wherein a granular solid contact material is recirculated through a solids contacting zone and a solids regeneration zone and a reactant fluid is passed through said contacting zone in contact with said solid material and said solid material is contacted with a regeneration fluid in said regeneration zone to regenerate said solids, the improvement which comprises preventing the intermixing of said reactant and regeneration fluids through flow thereof between said contacting and regeneration zones without the use of a foreign sealing fluid which comprises establishing a solids receiving and sealing leg zone in solids delivery relation to said contacting zone, introducing regenerated solids thereinto in the presence of a flow of regeneration fluid, passing a portion of said fluid concurrently with said solids to an intermediate point in said solids receiving zone, introducing a sealing fluid comprising a part of said reactant fluid into a fluid engaging zone surrounding said solids receiving and sealing leg zone, passing a secondary portion thereof upwardly countercurrent to said solids in said sealing leg zone to said intermediate point, removing the mixture of regeneration and sealing fluid from a first fluid disengaging zone at said intermediate point, passing the primary portion of said sealing fluid into said contacting zone for removal with the contacting zone effluent thereby preventing fluid intermixing at the solids inlet thereto, passing a fluid comprising a portion of said regeneration fluid countercurrent to solids through the solids outlet from said contacting zone to an adjacent second sealing fluid disengaging zone, passing another portion of said reactant fluid from said contacting zone concurrently with the solids into said second sealing fluid disengaging zone, and removing the fluid mixture thus formed therefrom whereby fluid flow between said contacting and regeneration zones is prevented.

2. A process according to claim 1 wherein said solids-fluid contacting process is a hydrocarbon conversion process and said regeneration fluid contains oxygen.

3. A process according to claim 2 wherein the solids comprise a hydrocarbon conversion catalyst.

4. A process according to claim 3 wherein the hydrocarbon is passed through said contacting zone in the presence of a recirculating stream of hydrogen, and the sealing fluid introduced into said solids receiving and sealing leg zone contains hydrogen to pretreat said catalyst therein.

5. A process according to claim 1 wherein said regeneration zone receives solids at its inlet through a solids pressuring zone from the solids outlet of said contacting zone, said solids are conveyed upwardly through said regeneration zone and substantially completely regenerated therein as a moving mass having a bulk density substantially equal to the solids' static bulk density by passing a conveyance-regeneration fluid concurrently therethrough and applying a force to the mass of solids issuing therefrom directly into said solids receiving and sealing leg zone to maintain said bulk density.

6. In a hydrocarbon conversion process wherein a recirculating stream of granular solid hydrocarbon conversion catalyst is passed downwardly as a moving bed by gravity through a hydrocarbon conversion zone, a hydrocarobn and hydrogen are separately introduced and passed therethrough under hydocarbon conversion conditions of pressure, temperature, and composition, leaving hydrocarbonaceous spent catalyst solids, said spent catalyst is passed upwardly through a regeneration zone concurrently with a conveyance-regeneration fluid containing oxygen at a rate sufficient to lift said catalyst and burn off the hydrocarbonaceous deposit forming substantially completely regenerated catalyst solids, said catalyst being maintained in said conveyance-regeneration zone as an upwardly moving mass having the static bulk density of said catalyst solids when at rest by applying a force against the mass of solids discharging therefrom, and said regenerated catalyst is returned to said hydrocarbon conversion zone, the improvement which comprises preventing flow of fluids between said hydrocarbon conversion zone and said conveyance-regeneration zone which comprises establishing a catalyst receiving and sealing leg zone in solids and spent conveyance-regeneration fluid receiving relation with said conveyance-regeneration zone and solids delivery relation to said hydrocarbon conversion zone and provided with a first fluid disengaging zone at an intermediate point therein and with a surrounding pretreating and sealing gas engaging zone and adapted to confine a downwardly moving bed of regenerated catalyst discharging into said hydrocarbon conversion zone, disengaging a primary portion of said spent conveyance-regeneration fluid from regenerated solids in said solids receiving zone, passing the secondary portion thereof concurrently with said regenerated catalyst to said first fluid disengaging zone, introducing a pretreating and sealing fluid containing hydrogen into said pretreating and sealing gas engaging zone, passing a primary portion thereof into engagement with solids discharged into said conversion zone to prevent hydrocarbon flow into said solids receiving and sealing leg zone, removing said primary portion with the hydrocarbon effluent from said conversion zone, passing the secondary portion of said pretreating fluid upwardly through said sealing leg zone countercurrent to regenerated catalyst flow therein into said first fluid disengaging zone to prevent flow of regeneration fluid into said conversion zone and to pretreat said catalyst forming a mixture with said secondary portion of conveyance-regeneration fluid in said first disengaging zone, removing the mixture therefrom at a controlled rate to maintain a pressure differential between said pretreating and sealing fluid engaging zone and said first disengaging zone, thereby maintaining the fluid seal at the solids inlet to said conversion zone without the use of an injected foreign sealing fluid, establishing a second sealing fluid disengaging zone adjacent the solids outlet of said conversion zone, passing a stream of spent conveyance-regeneration fluid upwardly counter-current to the downwardly moving bed of spent catalyst in said conversion zone into said second disengaging zone, passing a stream of hydrogen downwardly concurrently with said spent catalyst into said second disengaging zone, and removing the fluid mixture thus formed from said second disengaging zone to seal the solids outlet of said conversion zone without the use of foreign sealing fluids.

7. A process according to claim 6 wherein said catalyst comprises cobalt molybdate, said hydrocarbon comprises a naphtha fraction, a temperature of between about 700° F. and about 1100° F. and a pressure of between about 50 p. s. i. g. and about 2000 p. s. i. g. are maintained in said conversion zone, and between about 500 s. c. f. and about 10,000 s. c. f. of hydrogen per barrel of naphtha are passed through said conversion zone to reform and desulfurize said naphtha.

8. A process according to claim 6 in combination with the step of introducing at least part of said hydrogen into said conversion zone at a point between said second sealing fluid disengaging zone and the point at which said hydrocarbon is introduced thereinto whereby the major portion strips said spent catalyst of residual hydrocarbon after contact therewith in said hydrocarbon conversion zone and prior to removal therefrom for regeneration and the minor portion is removed from said second disengaging zone free of hydrocarbon.

9. A process according to claim 6 in combination with a spent catalyst pressuring zone between the catalyst outlet from said conversion zone and the catalyst inlet to said conveyance regeneration zone, and the step of increasing the pressure of fluids in the interstices of said spent catalyst in said pressuring zone by an amount substantially equal to that maintained between the inlet and the outlet of said conveyance-regeneration zone.

10. A process according to claim 9 in combination with the steps of cooling said primary portion of spent conveyance-regeneration fluid, compressing the cooled fluid by an amount substantially equal to the pressure differential existing between the inlet and the outlet of said conveyance-regeneration zone, introducing a first part thereof into said spent catalyst pressuring zone to increase the pressure of fluid in said interstices, adding an oxygen-containing fluid to the second portion of said spent conveyance-regeneration fluid to form a conveyance-regeneration fluid, and passing said last-named fluid through said conveyance-regeneration zone.

11. A process for contacting a fluid with a granular solid contact material which comprises recirculating a solid contact material through a contacting zone and a regeneration zone, passing a fluid to be contacted through said contacting zone forming spent solid contact material, contacting said material in said regeneration zone with a regeneration fluid to substantially completely regenerate said solid material, and preventing the intermixing of said reactant and regeneration fluids through flow thereof between said contacting and regeneration zones without the use of a foreign sealing fluid injected into the system between said zones which comprises establishing a solids receiving and sealing leg zone in solids delivery relation to said contacting zone, introducing regenerated solids thereinto in the presence of a flow of regeneration fluid, passing a portion of said fluid concurrently with said solids to an intermediate point in said solids receiving zone, introducing a sealing fluid comprising a part of said reactant fluid into a fluid engaging zone surrounding said solids receiving and sealing leg zone, passing a secondary portion thereof upwardly countercurrent to said solids in said sealing leg zone to said intermediate point, removing the mixture of regeneration and sealing fluid from a first fluid disengaging zone at said intermediate point, passing the primary portion of said sealing fluid into said contacting zone for removal with the contacting zone effluent thereby preventing fluid intermixing at the solids inlet thereto, passing a fluid comprising a portion of said regeneration fluid countercurrent to solids through the solids outlet from said contacting zone to an adjacent second sealing fluid disengaging zone, passing another portion of said reactant fluid from said contacting zone concurrently with the solids into said second sealing fluid disengaging zone, and removing the fluid mixture thus formed therefrom whereby fluid flow between said contacting and regeneration zones is prevented.

12. A process for conversion of hydrocarbons in the presence of a granular solid hydrocarbon conversion catalyst which comprises passing a stream of granular solid hydrocarbon conversion catalyst downwardly as a moving bed through a hydrocarbon conversion zone, passing a hydrocarbon therethrough under hydrocarbon conversion conditions of pressure, temperature, and composition forming converted hydrocarbons and a spent hydrocarbonaceous catalyst, passing said spent catalyst upwardly as a moving bed having substantially the solid catalyst's static bulk density through a conveyance-regeneration zone concurrently with a conveyance-regeneration fluid containing oxygen at a rate sufficient to lift said catalyst and burn off the hydrocarbonaceous deposit forming a substantially completely regenerated catalyst, applying a force against the mass of regenerated catalyst issuing from said conveyance-regeneration zone to maintain said static bulk density, preventing the flow of fluids between said hydrocarbon conversion zone and said conveyance-regeneration zone by establishing a catalyst receiving and sealing leg zone in solids and spent conveyance-regeneration fluid receiving relation with said conveyance-regeneration zone and solids delivery relation to said hydrocarbon conversion zone and provided with a first fluid disengaging zone at an intermediate point therein and with a surrounding pretreating and sealing gas engaging zone and adapted to confine a downwardly moving bed of regenerated catalyst discharging into said hydrocarbon conversion zone, disengaging a primary portion of said spent conveyance-regeneration fluid from regenerated solids in said solids receiving zone, passing the secondary portion thereof concurrently with said regenerated catalyst to said first fluid disengaging zone, introducing a pretreating and sealing fluid containing hydrogen into said pretreating and sealing gas engaging zone, passing a primary portion thereof into engagement with solids discharged into said conversion zone to prevent hydrocarbon flow into said solids receiving and sealing leg zone, removing said primary portion with the hydrocarbon effluent from said conversion zone, passing the secondary portion of said pretreating fluid upwardly through said sealing leg zone countercurrent to regenerated catalyst flow therein into said first fluid disengaging zone to prevent flow of regeneration fluid into said conversion zone and to pretreat said catalyst forming a mixture with said secondary portion of conveyance-regeneration fluid in said first disengaging zone, removing the mixture therefrom at a controlled rate to maintain a pressure differential between said pretreating and sealing fluid engaging zone and said first disengaging zone, thereby maintaining the fluid seal at the solids inlet to said conversion zone without the injection of an extraneous sealing fluid at that point, establishing a second sealing fluid disengaging zone adjacent the solids outlet of said conversion zone, passing a stream of spent conveyance-regeneration fluid upwardly countercurrent to the downwardly moving bed of spent catalyst in said conversion zone into said second disengaging zone, passing a stream of hydrogen downwardly concurrently with said spent catalyst into said second disengaging zone, and removing the fluid mixture thus formed from said second disengaging zone to seal the solids outlet of said conversion zone without the use of foreign sealing fluid injected at that point.

13. In an apparatus for contacting a granular solid contact material with a fluid which comprises a vertical contacting vessel, an inlet and an outlet for passing solid contact material therethrough, an inlet and an outlet for passing a reactant fluid therethrough in contact with said contact material, a regeneration chamber in solids-receiving relation to the solids outlet of said contacting column, and means for passing a regeneration fluid through said regeneration chamber to regenerate said contact material prior to returning it to said contacting vessel, the improved apparatus for preventing flow of fluid between said regeneration chamber and contacting vessel to avoid the injection of an extraneous sealing fluid which comprises a solids receiving and sealing leg chamber in solids and spent regeneration fluid receiving relation to said regeneration chamber and in solids delivery relation to said contacting column, an outlet conduit for a primary portion of spent regeneration fluid opening from the top of said solids receiving and sealing leg chamber above the solids and fluid inlet thereto from said regeneration chamber, a first sealing fluid disengaging means below said solids and fluid inlet, and outlet conduit for fluid opening therefrom, a baffle and dependent elongated sealing leg adapted to confine a downwardly moving bed of regenerated solids disposed below said disengaging means and within said solids receiving and sealing leg chamber, a sealing fluid inlet conduit for fluid opening into said last-named chamber at a point below said baffle whereby a primary flow of fluid enters said contacting vessel and a secondary flow thereof enters said sealing leg, said sealing leg having its lower outlet opening disposed within the top of said contacting vessel, means in said outlet conduit from said disengaging means for controlling the rate of fluid flow therefrom to maintain a secondary flow of spent regeneration fluid downwardly into said disengaging means at one point therein and maintain a secondary flow of said sealing fluid upwardly through said sealing leg into said disengaging means at another point therein, a second fluid disengaging means disposed within said contacting column adjacent the solids outlet thereof, an outlet conduit for fluid opening therefrom, and means for controlling the rate of fluid flow therethrough to maintain a flow of reactant downwardly thereinto and a flow of spent regeneration fluid upwardly thereinto whereby flow between said contacting vessel and said regeneration chamber is prevented.

14. An apparatus according to claim 13 wherein said regeneration chamber comprises a conveyance-regeneration conduit in solids receiving relation to the solids outlet from said contacting vessel and in solids delivery relation to said solids receiving chamber, means adjacent the outlet of said conveyance-regeneration chamber to apply a force against a mass of regenerated solids issuing therefrom, and means for compressing said spent regeneration fluid from the top of said solids receiving chamber and circulating it into and through said conveyance-regeneration zone as a conveyance fluid.

15. An apparatus according to claim 13 wherein said first sealing fluid disengaging means comprises a conical baffle having an open lower base and around which said solids flow, a cylindrical section disposed within and just below the lower periphery of said conical baffle whereby secondary flow of spent conveyance fluid flows into the space below said baffle through the annular space between its periphery and said cylindrical section, and said secondary flow of sealing fluid enters through said cylindrical section and mixes in the open space below said conical baffle.

16. An apparatus according to claim 14 in combination with a lower baffle having an upward and a downward flare and surrounding said sealing leg, the upper flare being disposed within said solids receiving and sealing leg chamber and the lower flare being disposed in the top of said contacting vessel and adapted to contain a bed of solids discharged from said sealing leg, the space between said lower baffle and said baffle and sealing leg being a sealing fluid engaging chamber.

17. An apparatus according to claim 16 wherein said fluid outlet from said contacting vessel opens therefrom at a point above and outside the lower periphery of said lower flared baffle.

18. An apparatus according to claim 14 in combination with a solids pressuring vessel having a valved inlet opening into the solids outlet from said contacting vessel and a valved outlet opening into the inlet of said conveyance-regeneration vessel, and a valved inlet conduit for compressed spent regeneration fluid opening from said compressor means into said solids pressuring vessel.

19. An apparatus according to claim 13 in combination with a differential pressure controller instrument connected to said solids receiving and sealing leg chamber at points above and below said baffle and sealing leg so as to detect the differential pressure across said sealing leg and connected to and adapted to actuate a valve in said inlet conduit opening from said first sealing fluid disengaging means to maintain a fixed differential pressure across said sealing leg.

References Cited in the file of this patent

UNITED STATES PATENTS

| | | |
|---|---|---|
| 2,335,610 | Plummer | Nov. 30, 1943 |
| 2,377,513 | Page | June 5, 1945 |
| 2,389,399 | Alther | Nov. 20, 1945 |
| 2,489,863 | Collins et al. | Nov. 29, 1949 |
| 2,504,215 | Montgomery et al. | Apr. 18, 1950 |
| 2,534,025 | Howes et al. | Dec. 12, 1950 |
| 2,684,124 | Hines | July 20, 1954 |
| 2,696,461 | Howard | Dec. 7, 1954 |
| 2,724,683 | Nadro | Nov. 22, 1955 |
| 2,744,053 | Kay et al. | May 1, 1956 |